J. WHARTON.
Making White Zinc.
No. 15,448.
Patented July 29, 1856.
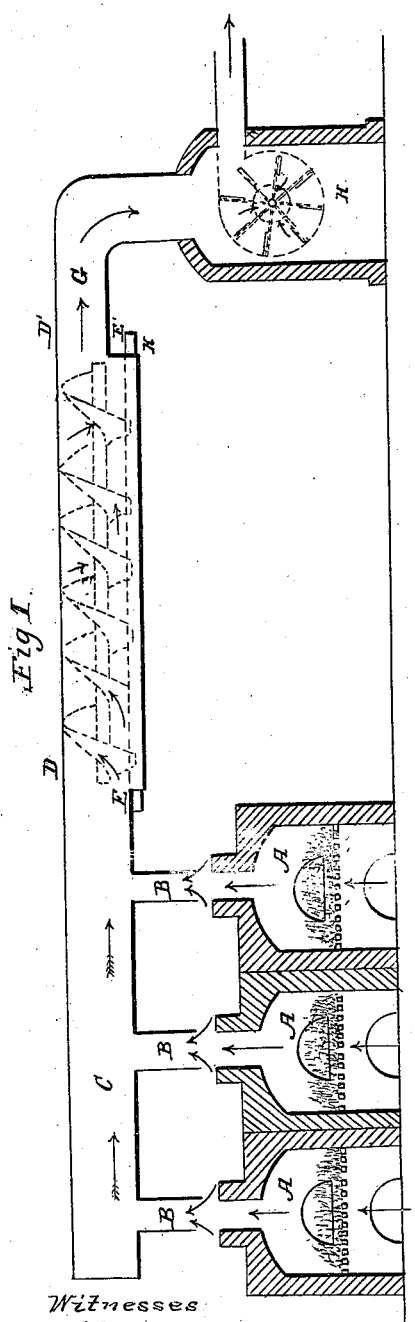
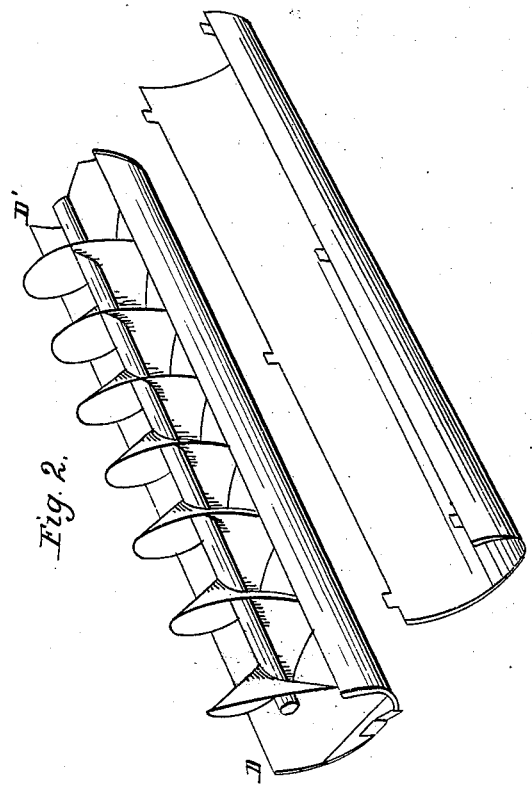
Witnesses
Inventor:
Joseph Wharton

UNITED STATES PATENT OFFICE.

JOSEPH WHARTON, OF PHILADELPHIA, PENNSYLVANIA.

IMPROVEMENT IN APPARATUS FOR PURIFYING WHITE OXIDE OF ZINC.

Specification forming part of Letters Patent No. 15,448, dated July 29, 1856.

*To all whom it may concern:*

Be it known that I, JOSEPH WHARTON, of the city of Philadelphia and State of Pennsylvania, have invented a new and useful Improvement in Cooling and Separating Zinc-White; and I hereby declare the following to be a full and exact description of the same, reference being had to the annexed drawings, in which—

Figure 1 is a view of a series of zinc-white furnaces with my improvement attached. Fig. 2 is a view of my improvement detached.

Heretofore in the manufacture of zinc-white in open furnaces it was customary to convey all the products of combustion in the zinc-white furnaces through flues into the base of one or more high towers or chambers, through which towers or chambers the products of combustion ascended slowly by reason of their increased proportionate section. During this slow ascent of the smoke, gases, oxide zinc, &c., the coal-dust, ashes, and other solid impurities, by reason of their gravity, fall to the bottom, while the white oxide continues on to the top, and is led off by an aperture at the top into proper collecting-chambers.

The nature of my improvement consists in conducting the products of combustion into and through a vessel or chamber of peculiar construction having its bottom covered with water. Onto the surface of this water the products of combustion from the zinc-oxide furnaces are forced to impinge a number of times in succession by reason of the peculiar construction of the chamber or vessel. The impurities—such as coal-dust, &c.—are caught by the water and sink to the bottom, and the white oxide passes on and eventually issues pure at the other extremity of the chamber, where it is collected in any ordinary manner.

In the accompanying drawings, A A A are a series of oxide-of-zinc furnaces constructed in one of the ordinary modes now adopted. These furnaces contain a mixture of the zinc ore and coal.

B B B are the vertical flues, which carry the products of combustion into a horizontal flue, C.

D D' is a chamber constructed so as to apply my improved process above mentioned. It is shown detached and with its top removed in Fig. 2. It consists of a metallic cylinder, D D'. Inside of this there is a helical or screw-like passage formed by winding a helical metallic plane around a central support. The lower edge of each screw is cut off, so that the helix shall not extend below the line E E'. Water is introduced into the bottom of the vessel D D', and this cutting of the lower part of the helix is for the purpose of allowing the water to pass freely along the bottom of the whole chamber D D'. This water is maintained at a uniform height at or little above the line E E' by being supplied from above or at one end in a constant stream or at intervals. The far extremity of this vessel D D' connects with the tube G, which communicates with an exhaust-fan at H. This exhaust-fan draws the products of combustion through the chamber D D', and discharges them into chambers, where the oxide of zinc is finally collected. The course pursued by the products of combustion is shown by the arrows on the drawings. These products are forced by the internal conformation of the chamber D D' to wind around in a helical course. At each turn of the helix these products are forced to impinge on the surface of the water on the bottom of the chamber.

I have found by actual experiment that the oxide of zinc, when first made, is a substance of extreme fineness and lightness, so that it floats along as lightly almost as if it were still in a state of vapor, while the carbonaceous or other impurities are successively caught by the water and precipitated from the zinc oxide, which continues on and finally escapes in a pure state at the extremity D', as above described.

Any impurities which have sunk to the bottom of the chamber may be removed by inserting a scraper at the orifice K.

Other shapes and arrangements of chamber might be employed for forcing the products to impinge successively on the surface of water; but I deem this one above described a very convenient and effective one. For example, a series of deflecting flanges or partitions might be arranged along the upper surface of a chamber for throwing down the products of combustion onto the surface of water.

The vapors and fumes discharged from muffles in the process of manufacturing white oxide may be passed through the chambers or vessels above described, the same as from the furnaces shown in the drawings.

Having thus described my improvement, what I claim as my invention, and desire to secure by Letters Patent, is—

Cooling white oxide of zinc and separating it from impurities by causing the products of the furnaces to impinge successively upon a surface of water, in the manner substantially as above described.

JOSEPH WHARTON.

Witnesses:
J. H. B. JENKINS,
J. C. SHAW.